US012767806B2

(12) United States Patent
Gkourmpis et al.

(10) Patent No.: US 12,767,806 B2
(45) Date of Patent: Oct. 20, 2026

(54) SEMICONDUCTIVE POLYPROPYLENE COMPOSITION

(71) Applicant: Borealis AG, Vienna (AT)

(72) Inventors: Thomas Gkourmpis, Stenungsund (SE); Katja Ellen Klimke, Linz (AT); Per-Ola Hagstrand, Stenungsund (SE); Ulf Nilsson, Stenungsund (SE); Lars Efraimsson, Stenungsund (SE); Anette Johansson, Stenungsund (SE)

(73) Assignee: Borealis AG, Vienna (AT)

( * ) Notice: Subject to any disclaimer, the term of this patent is extended or adjusted under 35 U.S.C. 154(b) by 662 days.

(21) Appl. No.: 18/039,023

(22) PCT Filed: Nov. 29, 2021

(86) PCT No.: PCT/EP2021/083328

§ 371 (c)(1),
(2) Date: May 26, 2023

(87) PCT Pub. No.: WO2022/122444

PCT Pub. Date: Jun. 16, 2022

(65) Prior Publication Data

US 2024/0002647 A1 Jan. 4, 2024

(30) Foreign Application Priority Data

Dec. 11, 2020 (EP) .................................... 20213348

(51) Int. Cl.

*C08L 23/14* (2006.01)
*C08K 3/04* (2006.01)
*H01B 3/44* (2006.01)

(52) U.S. Cl.

CPC .............. *C08L 23/142* (2013.01); *C08K 3/04* (2013.01); *H01B 3/441* (2013.01); *C08L 2203/202* (2013.01); *C08L 2207/02* (2013.01); *C08L 2308/00* (2013.01); *C08L 2314/02* (2013.01)

(58) Field of Classification Search

CPC ......... C08L 2203/202; C08L 2203/206; C08L 2207/02; C08L 23/14; C08K 3/04

See application file for complete search history.

(56) References Cited

U.S. PATENT DOCUMENTS

| | | | | |
|---|---|---|---|---|
| 3,401,020 | A | 9/1968 | Kester | |
| 3,922,335 | A | 11/1975 | Jordan | |
| 4,340,577 | A | 7/1982 | Sugawara | |
| 4,391,789 | A | 7/1983 | Estopinal | |
| 5,234,879 | A | 8/1993 | Garoff | |
| 9,852,826 | B2 | 12/2017 | Steffl et al. | |
| 10,308,794 | B2 | 6/2019 | Steffl et al. | |
| 2013/0025909 | A1* | 1/2013 | Perego | H01B 3/441 174/116 |
| 2013/0161059 | A1* | 6/2013 | Steffl | C08L 23/0853 252/511 |
| 2014/0190723 | A1* | 7/2014 | Vestberg | H01B 9/00 174/110 SR |
| 2014/0199547 | A1 | 7/2014 | Jamieson et al. | |
| 2016/0347943 | A1 | 12/2016 | Wang et al. | |

FOREIGN PATENT DOCUMENTS

| | | | | |
|---|---|---|---|---|
| CA | 3045056 | A1 * | 6/2018 | C08K 5/03 |
| CN | 102822257 | A | 12/2012 | |
| CN | 102971368 | A | 3/2013 | |
| CN | 103003351 | A | 3/2013 | |
| EP | 491566 | A2 | 6/1992 | |
| EP | 0586300 | A1 | 3/1994 | |
| EP | 0887379 | A1 | 12/1998 | |
| EP | 1681315 | A1 | 7/2006 | |
| EP | 2551299 | A1 | 1/2013 | |
| EP | 3495411 | A1 | 6/2019 | |
| EP | 3647349 | B1 * | 7/2024 | C08L 23/12 |
| KR | 20130121847 | | 11/2013 | |
| RU | 2389739 | C2 | 5/2010 | |
| WO | 9112182 | A1 | 8/1991 | |
| WO | 9219653 | A1 | 11/1992 | |

(Continued)

OTHER PUBLICATIONS

First Office Action and Search Report for Chinese Patent Application Serial No. 202180079848.6, dated Jul. 9, 2024, in Chinese and English, 14 pages.
Office Action with English Translation for Korean Patent Application No. 10-2023-7021508 dated Feb. 11, 2025, 26 pages.
International Search Report and Written Opinion for PCT/EP2021/083328 mailed Feb. 28, 2023, 13 pages.
Busico, et al., "Microstructure of polypropylene," Progress in Polymer Science, vol. 26, 2001, pp. 443-533.
Busico, et al., "Full Assignment of the 13C NMR Spectra of Regioregular Polypropylenes: Methyl and Methylene Region," Macromolecules, 1997, vol. 30, pp. 6251-6263, American Chemical Society.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.

(Continued)

*Primary Examiner* — Robert C Boyle
(74) *Attorney, Agent, or Firm* — Lowenstein Sandler LLP

(57) ABSTRACT

The present invention relates to a semiconductive composition comprising (A) at least 52.0 wt %, preferably from 55.0 to 90.0 wt %, more preferably from 60.0 to 85.0 wt %, most preferably from 65.0 to 80.0 wt % of a heterophasic propylene copolymer having a matrix phase and an elastomeric phase dispersed in said matrix phase, based on the total weight amount of the semiconductive composition; and (B) from 5.0 to 40.0 wt %, preferably from 10.0 to 38.0 wt %, more preferably from 15.0 to 35.0 wt %, most preferably from 20.0 to 33.0 wt % of carbon black based on the total weight amount of the semiconductive composition, an article comprising said semiconductive composition, preferably a cable comprising an semiconductive layer comprising said semiconductive composition and the use of said semiconductive composition as inner and/or outer semiconductive layer for medium and high voltage cables.

15 Claims, No Drawings

(56) References Cited

FOREIGN PATENT DOCUMENTS

| | | | |
|---|---|---|---|
| WO | 9219658 | A1 | 11/1992 |
| WO | 9318094 | A1 | 9/1993 |
| WO | 9924478 | A1 | 5/1999 |
| WO | 9924479 | A1 | 5/1999 |
| WO | 9933843 | A1 | 7/1999 |
| WO | 0068315 | A1 | 11/2000 |
| WO | 03000754 | A1 | 1/2003 |
| WO | 03000757 | A1 | 1/2003 |
| WO | 2004000899 | A1 | 12/2003 |
| WO | 2004111095 | A1 | 12/2004 |
| WO | 2006097497 | A1 | 9/2006 |
| WO | 2008041965 | A2 | 4/2008 |
| WO | 2011076780 | A1 | 6/2011 |
| WO | 2011092533 | A1 | 8/2011 |
| WO | 2011154287 | A1 | 12/2011 |
| WO | 2011154288 | A1 | 12/2011 |
| WO | 2013007650 | A1 | 1/2013 |
| WO | 2013092620 | A1 | 6/2013 |
| WO | 2015091839 | A1 | 6/2015 |
| WO | 2017198633 | A1 | 11/2017 |

OTHER PUBLICATIONS

Zhou, et al., "A new decoupling method for accurate quantification of polyethylene copolymer composition and triad sequence distribution with 13C NMR," Journal of Magnetic Resonance, vol. 187, 2007, pp. 225-233.

Resconi, et al., "Selectivity in Propene Polymerization with Metallocene Catalysts," Chem. Rev., 2000, vol. 100, pp. 1253-1345.

Wang, et al., "Structural Analysis of Ethylene/Propylene Copolymers Synthesized with a Constrained Geometry Catalyst," Macromolecules, 2000, vol. 33, pp. 1157-1162.

Cheng, H.N., "C NMR Analysis of Ethylene-Propylene Rubbers," Macromolecules, 1984, vol. 17, 1984, pp. 1950-1955.

Singh, et al., "Triad Sequence Determination of Ethylene-Propylene Copolymers—Application of Quantitative 13C NMR," Polymer Testing, 2009, vol. 29, pp. 475-479.

Kakugo, et al., "C NMR Determination of Monomer Sequence Distribution in Ethylene-Propylene Copolymers Prepared with s-TiCL 13-AL (C2H5)2C1," Macromolecules, 1982, vol. 15, pp. 1150-1152.

Randall et al. "A Review of High Resolution Liquid 13Carbon Nuclear Magnetic Resonance Characterizations of Ethylene-Based Polymers", Journal of Macromolecular Science, 201-319, 1989.

Search Report for Russian Application No. 2023116667/04 dated Jan. 26, 2024, 4 pages.

Kurguzova O.A. Development of Wear-Resistant Nanocomposite based on Polytetrafluoroethylene to Improve Working Capability and Durability of Metal-Polymer Sealing Devices. Ph.D. thesis, Omsk], 2014.

Bychuk M.A. Preparation and Properties of Polymer Films Based on Poly-3-hydroxybutyrate and Polycaprolactone. Ph.D. thesis, Moscow], 2016.

* cited by examiner

SEMICONDUCTIVE POLYPROPYLENE COMPOSITION

CROSS-REFERENCE TO RELATED APPLICATION(S)

The present application is a national stage entry under 35 U.S.C. § 371 of International Application No. PCT/EP2021/083328, filed on Nov. 29, 2021, which claims priority to European Patent Application No. 20213348.4, filed on Dec. 11, 2020. The contents of these applications are hereby incorporated by reference in their entirety.

FIELD OF THE INVENTION

The present invention relates to a semiconductive composition comprising a heterophasic propylene copolymer, an article comprising said semiconductive composition, which is preferably a cable comprising a semiconductive layer comprising said semiconductive composition and the use of said semiconductive composition as inner and/or outer semiconductive layer for medium and high voltage cables.

TECHNICAL BACKGROUND

Compositions used for semiconductive layers of cables usually include a solid conductive filler such as carbon black in amounts of about 40 to 50 wt % in order to render these compositions semiconductive. Such high amounts of conductive filler have the drawback of poor miscibility with the polymeric components which impairs the mechanical properties of the semiconductive compositions.

The aim in the art therefore is to provide semiconductive compositions showing good conductivity and good mechanical properties.

WO 2011/154287 A1 and WO 2011/154288 A1 disclose semiconductive compositions comprising a heterophasic propylene copolymer as main polymeric component and a reduced amount of carbon black. These compositions show sufficient mechanical properties and sufficient conductivity. However, there is still room for improvement.

Thus, there is a need in the art for semiconductive compositions which show a good balance of properties such as good processability, good conductivity and good mechanical properties.

It has been found that when using a specific heterophasic propylene copolymer in a semiconductive composition the amount of carbon black can be reduced to obtain a semiconductive composition with good processability, good conductivity, good mechanical properties.

SUMMARY OF THE INVENTION

In one aspect the present invention relates to a semiconductive composition comprising (A) at least 52.0 wt %, preferably from 55.0 to 90.0 wt %, more preferably from 60.0 to 85.0 wt %, most preferably from 65.0 to 80.0 wt % of a heterophasic propylene copolymer having a matrix phase and an elastomeric phase dispersed in said matrix phase, based on the total weight amount of the semiconductive composition; and (B) from 5.0 to 40.0 wt %, preferably from 10.0 to 38.0 wt %, more preferably from 15.0 to 35.0 wt %, most preferably from 20.0 to 33.0 wt % of carbon black based on the total weight amount of the semiconductive composition.

In another aspect the present invention relates to an article comprising the semiconductive composition as described above or below.

Preferably said article is a cable comprising a semiconductive layer, more preferably an inner and/or outer semiconductive layer, comprising said semiconductive composition as described above or below.

In yet another aspect the present invention relates to the use of a semiconductive composition as described above or below as inner and/or outer semiconductive layer for medium and high voltage cables.

Definitions

A heterophasic polypropylene is a propylene-based copolymer with a crystalline matrix phase, which can be a propylene homopolymer or a random copolymer of propylene and at least one alpha-olefin comonomer, and an elastomeric phase dispersed therein. The elastomeric phase can be a propylene copolymer with a high amount of comonomer, which is not randomly distributed in the polymer chain but are distributed in a comonomer-rich block structure and a propylene-rich block structure.

A heterophasic polypropylene usually differentiates from a one-phasic propylene copolymer in that it shows two distinct glass transition temperatures Tg which are attributed to the matrix phase and the elastomeric phase respectively.

A propylene homopolymer is a polymer, which essentially consists of propylene monomer units. Due to impurities especially during commercial polymerization processes a propylene homopolymer can comprise up to 0.1 mol % comonomer units, preferably up to 0.05 mol % comonomer units and most preferably up to 0.01 mol % comonomer units.

A propylene random copolymer is a copolymer of propylene monomer units and comonomer units in which the comonomer units are distributed randomly over the polypropylene chain. Thereby, a propylene random copolymer includes a fraction, which is insoluble in xylene—xylene cold insoluble (XCI) fraction—in an amount of more than 70 wt %, more preferably of at least 85 wt %, still more preferably of at least 88 wt %, most preferably of at least 90 wt %, based on the total amount of propylene random copolymer. Accordingly, the propylene random copolymer does not contain an elastomeric polymer phase dispersed therein.

Usually, a propylene polymer comprising at least two propylene polymer fractions (components), which have been produced under different polymerization conditions resulting in different (weight average) molecular weights and/or different comonomer contents for the fractions, preferably produced by polymerizing in multiple polymerization stages with different polymerization conditions, is referred to as "multimodal". The prefix "multi" relates to the number of different polymer fractions the propylene polymer is consisting of. As an example of multimodal propylene polymer, a propylene polymer consisting of two fractions only is called "bimodal", whereas a propylene polymer consisting of three fractions only is called "trimodal".

A unimodal propylene polymer only consists of one fraction.

Thereby, the term "different" means that the propylene polymer fractions differ from each other in at least one property, preferably in the weight average molecular weight—which can also be measured in different melt flow rates of the fractions—or comonomer content or both.

"Functionalized" means herein a chemical modification, preferably grafting or copolymerising with a mono- or polycarboxylic compound or a derivative of a mono- or polycarboxylic compound to provide the desired functional groups.

Vis-breaking is a post reactor chemical process for modifying semi-crystalline polymers such as propylene polymers. During the vis-breaking process, the propylene polymer backbone is degraded by means of peroxides, such as organic peroxides, via beta scission. The degradation is generally used for increasing the melt flow rate and narrowing the molecular weight distribution.

In the following amounts are given in % by weight (wt %) unless it is stated otherwise.

DETAILED DESCRIPTION OF THE INVENTION

Semiconductive Composition

In one aspect the present invention relates to a semiconductive composition comprising (A) at least 52.0 wt %, preferably from 55.0 to 90.0 wt %, more preferably from 60.0 to 85.0 wt %, most preferably from 65.0 to 80.0 wt % of a heterophasic propylene copolymer having a matrix phase and an elastomeric phase dispersed in said matrix phase, based on the total weight amount of the semiconductive composition; and (B) from 5.0 to 40.0 wt %, preferably from 10.0 to 38.0 wt %, more preferably from 15.0 to 35.0 wt %, most preferably from 20.0 to 33.0 wt % of carbon black based on the total weight amount of the semiconductive composition.

The semiconductive composition comprises at least 52.0 wt %, preferably from 55.0 to 79.0 wt %, more preferably from 60.0 to 76.0 wt %, most preferably from 65.0 to 74.0 wt % of a heterophasic propylene copolymer (A) having a matrix phase and an elastomeric phase dispersed in said matrix phase, based on the total weight amount of the semiconductive composition.

Further, the semiconductive composition comprises from 21.0 to 35.0 wt %, preferably from 22.5 to 33.0 wt %, more preferably from 24.0 to 32.0 wt %, most preferably from 26.0 to 30.0 wt % of carbon black based on the total weight amount of the semiconductive composition.

In one embodiment the semiconductive composition has a specific range of amount of carbon black.

In said embodiment the upper limit of the amount of carbon black is usually not more than 35.0 wt %, preferably not more than 33.0 wt %, more preferably not more than 32.0 wt % and most preferably not more than 30 wt %, based on the total weight amount of the semiconductive composition.

The upper limit of the amount of carbon black in said embodiment is usually at least 15.0 wt %, preferably at least 17.5 wt %, more preferably at least 20.0 wt % and most preferably at least 21.0 wt %, based on the total weight amount of the semiconductive composition.

In said embodiment the amounts of the heterophasic propylene copolymer (A) are usually accordingly in the range of from 52.0 to 85.0 wt %, preferably from 55.0 to 82.5 wt %, more preferably from 60.0 to 80.0 wt % and most preferably from 65.0 to 79.0 wt %, based on the total weight amount of the semiconductive composition.

The semiconductive composition can additionally comprise a polyolefin functionalized with a mono- or polycarboxylic acid compound or a derivative of a mono- or polycarboxylic acid compound (C), wherein the functionalized polyolefin (C) is different from the heterophasic propylene copolymer (A).

Said functionalized polyolefin (C) is preferably present in the semiconductive composition in an amount of not more than 5.0 wt %, preferably from 0.05 to 2.5 wt %, more preferably from 0.1 to 1.0 wt %, most preferably from 0.2 to 0.8 wt %, based on the total weight amount of the semiconductive composition.

The components (A), (B) and (C) are further described below.

The semiconductive composition can further comprise polymeric components in addition to components (A) and optionally (C). It is however preferred that the semiconductive composition does not further comprise polymeric components in addition to components (A) and optionally (C), i.e. that the polymeric components of the semiconductive composition consist of components (A) and optionally (C). In one embodiment the polymeric components of the semiconductive composition consist of components (A) and (C). In another embodiment the polymeric components of the semiconductive composition consist of component (A).

The semiconductive composition preferably does not comprise, i.e. is free of a polymer comprising polar monomer units, such as acetate or acrylate or derivatives thereof containing monomer units.

The amount of the polymeric components, preferably of components (A) and optionally (C), in the semiconductive composition is preferably in the range of from 60.0 to 95.0 wt %, more preferably from 62.0 to 90.0 wt %, most preferably from 67.0 to 80.0 wt % based on the total weight of the semiconductive composition.

The semiconductive composition may comprise further component(s), such as additive(s), which may optionally be added in a mixture with a carrier polymer, e.g. in a so-called master batch. Also the carbon black (C) can be added in form of a master batch. In such cases the carrier polymer is not calculated to the amount of the polymer components. The amount of additives and the carrier polymer of any master batch is calculated to the total amount (100% wt) of the polymer composition.

Additives, if present, are preferably selected from antioxidant(s), stabiliser(s), processing aid(s), flame retardant additive(s), water tree retardant additive(s), acid or ion scavenger(s) and inorganic filler(s) as known in the polymer field.

The amount of further components in the semiconductive composition is preferably not higher than 10.0 wt %, such as 0 to 5.0 wt % or 0 to 2.5 wt % of the total amount of the semiconductive composition.

It is preferred that the semiconductive composition does not comprise, i.e. is free of 2,2,4-trimethyl-1,2-dihydroquinoline (TMQ). In cable applications, in which the semiconductive composition is used in semiconductive layer(s), TMQ tends to partly diffuse from the semiconductive layer(s) into the insulation layer and can cause a yellow discoloration of the insulation layer.

In one embodiment, the semiconductive composition comprises, preferably consists of components (A) and (B), optional component (C) and optional further components, such as additives but is free of a polymer comprising polar monomer units and 2,2,4-trimethyl-1,2-dihydroquinoline (TMQ), preferably comprises, more preferably consists of components (A) and (B), and optional further components, such as additives but is free of a polymer comprising polar monomer units and 2,2,4-trimethyl-1,2-dihydroquinoline (TMQ).

In another embodiment, the semiconductive composition consists of components (A), (B) and optional component (C), preferably consists of components (A) and (B).

The semiconductive composition preferably has a melt flow rate $MFR_{10}$ (230° C., 10 kg load) of from 0.5 to 15.0 g/10 min, more preferably from 1.0 to 12.5 g/10 min, most preferably from 1.5 to 10.0 g/10 min.

The semiconductive composition preferably has a density of from 0.850 to 1.200 g/cm$^3$, more preferably from 0.950 to 1.100 g/cm$^3$, most preferably from 1.000 to 1.075 g/cm$^3$.

Further, the semiconductive composition preferably has a volume resistivity (VR) of from 1.0 to 750 Ohm·cm, preferably from 1.5 to 250 Ohm·cm, most preferably from 1.7 to 100 Ohm·cm.

In some embodiments the volume resistivity can be as low as 50 Ohm·cm, preferably as low as 25 Ohm·cm, most preferably as low as 10 Ohm·cm.

Additionally, the semiconductive composition preferably has a tensile strength of at least 5.0 MPa, more preferably at least 6.0 MPa, still more preferably at least 7.5 MPa and most preferably at least 10 MPa.

The upper limit of the tensile strength is preferably not more than 25.0 MPa, more preferably not more than 22.5 MPa and most preferably not more than 20.0 MPa.

Further, the semiconductive composition preferably has an elongation at break of at least 300%, more preferably at least 350%, still more preferably at least 400% and most preferably at least 500%.

The upper limit of the elongation at break is preferably not more than 800%, more preferably not more than 750% and most preferably not more than 650%.

Thus, the semiconductive composition according to the invention surprisingly shows a good balance of properties in regard of processability, conductivity and mechanical properties.

It is preferred that the semiconductive composition is not crosslinked.

A crosslinked polymer composition has a typical network, i.a. interpolymer crosslinks (bridges), as well known in the field. Those bridges can be introduced by creating radicals in the polymeric chain e.g. by reaction with peroxides or exposure to radiation or introduction of a functional group into the polymeric chain which is prone to chemical reaction with another one of said functional groups. During crosslinking a crosslinked polymer composition becomes thermoset.

It is preferred that the semiconductive composition is thermoplastic.

Preferably, the semiconductive composition is prepared by melt blending the components (A) and (B), and optional component (C) and optional further components such as optional additives and further polymeric components, all as described above or below.

Heterophasic Propylene Copolymer (A)

The heterophasic propylene copolymer (A) has a matrix phase and an elastomeric phase dispersed in said matrix phase.

The matrix phase is preferably a propylene random copolymer.

The comonomer units of the matrix phase are preferably are selected from ethylene and alpha-olefins having from 4 to 12 carbon atoms, such as ethylene, 1-butene, 1-hexene or 1-octene. The propylene random copolymer of the matrix phase can comprise one type of comonomer units or two or more types such as two types of comonomer units. It is preferred that the propylene random copolymer of the matrix phase comprises one type of comonomer units. Especially preferred is ethylene.

In a heterophasic propylene copolymer, the matrix phase and the elastomeric phase usually cannot exactly be divided from each other. In order to characterize the matrix phase and the elastomeric phase of a heterophasic polypropylene copolymer several methods are known. One method is the extraction of a fraction which contains to the most part the elastomeric phase with xylene, thus separating a xylene cold solubles (XCS) fraction from a xylene cold insoluble (XCI) fraction. The XCS fraction contains for the most part the elastomeric phase and only a small part of the matrix phase whereas the XCI fraction contains for the most part the matrix phase and only a small part of the elastomeric phase.

The heterophasic propylene copolymer (A) preferably has a xylene cold soluble (XCS) fraction in a total amount of from 25.0 to 50.0 wt %, preferably from 30.0 to 47.5 wt %, most preferably from 32.5 to 45.0 wt %, based on the total weight amount of the heterophasic copolymer of propylene (A).

The xylene cold soluble (XCS) fraction preferably has an amount of comonomer units, preferably of ethylene, of from 20.0 to 35.0 wt %, preferably from 22.5 to 32.5 wt %, most preferably from 23.0 to 31.0 wt %, based on the total amount of monomer units in the xylene cold soluble (XCS) fraction of the heterophasic copolymer of propylene (A).

Further, the xylene cold soluble (XCS) fraction preferably has an intrinsic viscosity of from 100 to 350 cm$^3$/g, preferably from 130 to 325 cm$^3$/g, most preferably from 150 to 300 cm$^3$/g, measured at 135° C. in decalin.

Further, the heterophasic copolymer of propylene (A) preferably has a fraction insoluble in cold xylene (XCI) in an amount of from 50.0 to 75.0 wt %, more preferably from 52.5 to 70.0 wt %, most preferably from 55.0 to 67.5 wt %, based on the total weight amount of the heterophasic copolymer of propylene (A).

The fraction insoluble in cold xylene (XCI) preferably has an amount of comonomer units, preferably of ethylene, of from 2.5 to 12.5 wt %, preferably from 3.5 to 10.0 wt %, most preferably from 4.5 to 8.5 wt %, based on the total amount of monomer units in the fraction insoluble in cold xylene (XCI) of the heterophasic copolymer of propylene (A).

Further, the fraction insoluble in cold xylene (XCI) preferably has an intrinsic viscosity of from 130 to 380 cm$^3$/g, preferably from 150 to 350 cm$^3$/g, most preferably from 180 to 325 cm$^3$/g, measured at 135° C. in decalin.

The ratio of the intrinsic viscosities of the XCI fraction to the XCS fraction of the copolymer of propylene is preferably in the range of from 0.9 to 1.5, more preferably from 1.0 to 1.4 and most preferably from 1.0 to 1.3.

The comonomer units of the heterophasic copolymer of propylene (A) are preferably selected from ethylene and alpha-olefins having from 4 to 12 carbon atoms, such as ethylene, 1-butene, 1-hexene or 1-octene. The copolymer of propylene can comprise one type of comonomer units or two or more types such as two types of comonomer units. It is preferred that the copolymer of propylene comprises one type of comonomer units. Especially preferred is ethylene.

It is preferred that the comonomer units of the matrix phase are the same as the comonomer units of the heterophasic copolymer of propylene (A).

The heterophasic copolymer of propylene (A) preferably has a total amount of comonomer units, preferably of ethylene, of from 7.5 to 20.0 wt %, preferably from 9.0 to 17.5 wt %, most preferably from 10.0 to 15.0 wt %, based on the total amount of monomer units of the heterophasic copolymer of propylene (A).

The heterophasic copolymer of propylene (A) preferably has a melt flow rate $MFR_2$ of 0.5 to 10.0 g/10 min, preferably from 0.7 to 7.5 g/10 min, most preferably from 1.0 to 5.0 g/10 min.

In one embodiment the heterophasic copolymer of propylene (A) preferably has a melt flow rate $MFR_2$ of 0.5 to 2.5 g/10 min, preferably from 0.8 to 2.2 g/10 min, still more preferably from 1.0 to 2.0 g/10 min and most preferably from 1.2 to 1.9 g/10 min.

In another embodiment the heterophasic copolymer of propylene (A) preferably has a melt flow rate $MFR_2$ of 2.5 to 10.0 g/10 min, preferably from 3.0 to 7.5 g/10 min, most preferably from 3.5 to 5.0 g/10 min.

The heterophasic copolymer of propylene (A) preferably has an intrinsic viscosity of from 150 to 350 $cm^3/g$, preferably from 170 to 325 $cm^3/g$, most preferably from 200 to 300 $cm^3/g$, measured at 135° C. in decalin.

The heterophasic copolymer of propylene (A) preferably has a flexural modulus of from 130 MPa to 425 MPa, more preferably of from 150 MPa to 400 MPa and most preferably of from 175 MPa to 390 MPa.

Preferably, the heterophasic copolymer of propylene (A) has a Charpy notched impact strength at 23° C. of from 40 to 110 $kJ/m^2$, more preferably from 50 to 100 $kJ/m^2$ and most preferably from 55 to 95 $kJ/m^2$.

Further, the heterophasic copolymer of propylene (A) has a melting temperature Tm of from 140 to 159° C., preferably from 142 to 155° C., most preferably from 145 to 153° C.

Additionally, the heterophasic copolymer of propylene (A) preferably has a crystallization temperature Tc of from 85 to 125° C., preferably from 88 to 122° C., most preferably from 90 to 120° C.

Still further, the heterophasic copolymer of propylene (A) preferably has a difference in melting temperature to crystallization temperature Tm-Tc of from 20 to 70° C., preferably from 25 to 60° C., most preferably from 30 to 55° C.

The heterophasic copolymer of propylene (A) can be polymerized in a sequential multistage polymerization process, i.e. in a polymerization process in which two or more polymerization reactors are connected in series. Preferably, in the sequential multistage polymerization process, two or more, more preferably three or more, such as three or four, polymerization reactors are connected in series. The term "polymerization reactor" shall indicate that the main polymerization takes place. Thus in case the process consists of four polymerization reactors, this definition does not exclude the option that the overall process comprises for instance a pre-polymerization step in a pre-polymerization reactor.

The matrix phase of the heterophasic propylene copolymer (A) is preferably polymerized in first polymerization reactor for producing a unimodal matrix phase or in the first and second polymerization reactor for producing a multimodal matrix phase.

The elastomeric phase of the heterophasic propylene copolymer (A) is preferably polymerized in the subsequent one or two polymerization reactor(s) in the presence of the matrix phase for producing a unimodal elastomeric phase or a multimodal elastomeric phase.

Preferably, the polymerization reactors are selected from slurry phase reactors, such as loop reactors and/or gas phase reactors such as fluidized bed reactors, more preferably from loop reactors and fluidized bed reactors.

A preferred sequential multistage polymerization process is a "loop-gas phase"-process, such as developed by *Borealis* A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Suitable sequential polymerization processes for polymerizing the heterophasic propylene copolymer (A) are e.g. disclosed in EP 1 681 315 A1 or WO 2013/092620 A1.

The heterophasic propylene copolymer (A) can be polymerized in the presence of a Ziegler-Natta catalyst or a single site catalyst.

Suitable Ziegler-Natta catalysts are e.g. disclosed in U.S. Pat. No. 5,234,879, WO 92/19653, WO 92/19658, WO 99/33843, WO 03/000754, WO 03/000757, WO 2013/092620 A1 or WO 2015/091839.

Suitable single site catalysts are e.g. disclosed in WO 2006/097497, WO 2011/076780 or WO 2013/007650.

The heterophasic copolymer of propylene (A) can be subjected to a visbreaking step as e.g. described in WO 2013/092620 A1.

In one embodiment the heterophasic copolymer of propylene (A) is subjected to a visbreaking step. In said embodiment the heterophasic propylene copolymer (A) has a melt flow rate $MFR_2$ of from 2.5 to 10.0 g/10 min, preferably from 3.0 to 7.5 g/10 min, most preferably from 3.5 to 5.0 g/10 min.

In one embodiment the heterophasic copolymer of propylene (A) is not subjected to a visbreaking step. In said embodiment the heterophasic propylene copolymer (A) has a melt flow rate $MFR_2$ of from 0.5 to 2.5 g/10 min, preferably from 0.8 to 2.2 g/10 min, still more preferably from 1.0 to 2.0 g/10 min and most preferably from 1.1 to 1.9 g/10 min.

In one embodiment the heterophasic propylene copolymer (A) comprises an alpha-nucleating agent. The alpha-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, and (iii) salts of diesters of phosphoric acid, e.g. sodium 2,2'-methylenebis (4,6-di-tertbutylphenyl) phosphate or aluminium-hydroxy-bis[2,2'-methylene-bis(4,6-di-tbutylphenyl)phosphate], and (iv) vinylcycloalkane polymer and vinylalkane polymer (as discussed in more detail below), and (v) mixtures thereof.

Preferably, in this embodiment the heterophasic propylene copolymer (A) contains from 0.00001 to 5.00 wt %, more preferably from 0.0001 to 2.50 wt % of the alpha-nucleating agent.

The amount of pure alpha-nucleating agent in the heterophasic propylene copolymer (A) (without optional carrier polymer of a master batch) is preferably in the range of from 0.01 to 2000 ppm, more preferably from 0.1 to 1000 ppm.

The alpha-nucleating agent is preferably selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, vinylcycloalkane polymer, vinylalkane polymer, and mixtures thereof.

Especially preferred are vinylcycloalkane polymers such as e.g. vinylcyclohexane (VCH) polymers. Such polymers can be added e.g. using *Borealis* Nucleation Technology (BNT).

The alpha-nucleating agent can be added to the heterophasic propylene copolymer (A) as an isolated raw material or in a mixture with a carrier polymer, i.e. in a so-called master batch. The amount of the carrier polymer of the master batch thereby is calculated to the amount of the alpha-nucleating agent.

In another embodiment the heterophasic copolymer of propylene (A) does not comprise, i.e. is free of alpha-nucleating agents.

Heterophasic propylene copolymer resins suitable as heterophasic copolymer of propylene (A) are also commercially available. These resins are usually already additivated with stabilizer packages. Thus, when using commercially available resins as copolymer of propylene the addition of additives as described above might have to be adjusted to the already present additives.

Carbon Black (B)

Any carbon black which is electrically conductive can be used. Typically, the carbon black will be a specialty carbon black or a P-type black. Non-limiting examples of suitable carbon blacks include furnace blacks and acetylene blacks.

The carbon black may have a nitrogen adsorption surface area (NSA) of 5 to 400 $m^2/g$, for example of 10 to 300 $m^2/g$, e.g. of 30 to 200 $m^2/g$, when determined according to ASTM D6556-19.

Further, the carbon black may have one or more of the following properties:

i) a primary particle size of at least 5 nm, e.g. 10 to 30 nm, or 11-20 nm which is defined as the average particle diameter according to ASTM D3849-14, ii) iodine adsorption number of at least 10 mg/g, for example 10 to 300 mg/g, such as 30 to 250 mg/g, e.g. 60 (or 61) to 200 mg/g, or 80 to 200 mg/g, or 100 to 170 mg/g, when determined according to ASTM D-1510-19; and/or iii) oil absorption number (OAN) of at least 30 ml/100 g, for example 50 to 300 ml/100 g, e.g. 50 to 250 ml/100 g, for example 70 to 200 ml/100 g, e.g. 90 to 130 ml/100 g, or 70 to 119 (or 120) ml/100 g, when measured according to ASTM D 2414-19.

One group of suitable furnace blacks have a primary particle size of 28 nm or less. Particularly suitable furnace blacks of this category may have an iodine adsorption number between 60 and 300 mg/g. It is further suitable that the oil absorption number (of this category) is between 50 and 225 ml/100 g, for example between 50 and 200 ml/100 g.

Other suitable carbon blacks can be made by any other process or can be further treated. Suitable carbon blacks for semiconductive cable layers are suitably characterized by their cleanliness. Therefore, suitable carbon blacks have an ash-content of less than 0.2 wt % measured according to ASTM D1506, a 325 mesh sieve residue of less than 30 ppm according to ASTM D1514 and have less than 3 wt %, preferably less than 1 wt % total sulphur according to ASTMD1619.

Furnace carbon black is a generally acknowledged term for the well-known carbon black type that is produced in a furnace-type reactor. As examples of carbon blacks, the preparation process thereof and the reactors, reference can be made to i.a. EP629222 of Cabot, U.S. Pat. Nos. 4,391,789, 3,922,335 and 3,401,020. As an example of commercial furnace carbon black grades N115, N351, N293, N220 and N550 can be mentioned. To further increase the suitability of such carbon blacks in semiconductive compounds, modifications of these commercial carbon blacks e.g. in terms of cleanliness, pellet properties and surface area are advantageous. Furnace carbon blacks are conventionally distinguished from acetylene carbon blacks which are another carbon black type suitable for the semiconductive polymer composition.

Acetylene carbon blacks are produced in an acetylene black process, e.g. as described in U.S. Pat. No. 4,340,577. Particularly, acetylene blacks may have a particle size of larger than 20 nm, for example 20 to 80 nm. The mean primary particle size is defined as the average particle diameter according to the ASTM D3849-14. Suitable acetylene blacks of this category have an iodine adsorption number between 30 to 300 mg/g, for example 30 to 150 mg/g according to ASTM D1510. Further the oil absorption number (of this category) is, for example between 80 to 300 ml/100 g, e.g. 100 to 280 ml/100 g and this is measured according to ASTM D2414. Acetylene black is a generally acknowledged term and are very well known and e.g. supplied by Denka.

Functionalized Polyolefin (C)

"Functionalized with a mono- or polycarboxylic acid compound or a derivative of a mono- or polycarboxylic acid compound" or shortly "functionalized" means herein generally that the polymer is functionalized with carbonyl containing groups originating from said mono- or polycarboxylic acid group or a derivative thereof.

The carbonyl containing compound used for the functionalization is typically unsaturated. Such compound contains preferably at least one ethylenic unsaturation and at least one carbonyl group. Such carbonyl containing groups can be incorporated to a polymer by grafting a compound bearing said carbonyl containing group(s) or by copolymerising a monomer with a comonomer(s) bearing such carbonyl containing group(s).

Herein, the functionalized carbonyl containing compound of functionalized polyolefin (C) is understood not to mean any polar comonomer(s), e.g. an acrylate, a methacrylate or an acetate comonomer.

The functionalized polyolefin (C) is different from the heterophasic copolymer of propylene (A).

The functionalized polyolefins (C) suitable for the present invention are well known and are commercially available or can be produced according to the known processes described in the chemical literature.

Preferable polycarboxylic acid compounds for functionalization are unsaturated dicarboxylic acids or derivatives thereof. More preferable carbonyl containing compounds for the functionalization are derivatives of unsaturated mono- or polycarboxylic acid compounds, more preferably derivatives of unsaturated dicarboxylic acids. Preferred carbonyl containing compounds for functionalization are anhydrides of a mono- or polycarboxylic acid, which are also referred as "acid anhydrides" or "anhydrides". The acid anhydrides can be linear or cyclic.

Preferably, the functionalized polyolefin (C) is an acid anhydride functionalized polyolefin, more preferably a maleic anhydride (MAH) functionalized polyolefin (B). Preferably, the functionalized polyolefin (C) is obtainable by grafting maleic anhydride to a polyolefin (also referred herein shortly as MAH grafted polyolefin or MAH-g-polyolefin).

Preferred polyolefin for functionalized polyolefin (C) is a functionalized polypropylene or polyethylene. Both polyolefin types are well known in the field.

In case the functionalized polyolefin (C) is a functionalized polyethylene, then it is preferably selected from a polyethylene produced in a low pressure process using a coordination catalyst or a polyethylene produced in a high pressure (HP) polymerization process and which bears said carbonyl containing groups. Both meanings are well known in the field.

The MFR (190° C., 2.16 kg) of the functionalized polyethylene (C) is preferably of above 0.05 g/10 min, preferably from 0.1 to 200 g/20 min, preferably from 0.80 to 100 g/10 min, more preferably from 10.0 to 50.0 g/10 min.

In case the functionalized polyolefin (C) is a functionalized polyethylene produced in a low pressure process using a coordination catalyst, then it is preferably selected from copolymers of ethylene with one or more comonomer(s), preferably alpha-olefin(s). Such polyethylene copolymers have preferably a density of from 850 to 950 $kg/m^3$, preferably from 900 to 945 $kg/m^3$, preferably from 910 to 940 $kg/m^3$.

Such functionalized polyethylene copolymer is preferably a functionalized linear low density polyethylene copolymers (LLDPE) which preferably has a density from 915 to 930 $kg/m^3$. Preferable LLDPE as functionalized polyolefin (C) is MAH functionalized LLDPE, preferably MAH-g-LLDPE.

In case the functionalized polyolefin (C) is a functionalized polyethylene produced in a HP process, then the polyethylene is preferably produced by radical polymerization in a HP process in the presence of an initiator(s). The HP reactor can be e.g. a well known tubular or autoclave reactor or a mixture thereof, preferably a tubular reactor.

The high pressure (HP) polymerization and the adjustment of process conditions for further tailoring the other properties of the polyolefin depending on the desired end application are well known and described in the literature, and can readily be used by a skilled person. Suitable polymerization temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps. Such functionalized polyethylene produced in a HP process is preferably a low density polyethylene (LDPE) which is functionalized and preferably has a density of from 900 to 950 $kg/m^3$, preferably from 910 to 940 $kg/m^3$, preferably from 915 to 930 $kg/m^3$. More preferably, the functionalized LDPE polymer is selected from a LDPE homopolymer or a LDPE copolymer of ethylene with one or more comonomers (referred herein also as functionalized polar LDPE copolymer), which bears said carbonyl containing groups. Suitable comonomers for functionalized LDPE copolymer are selected from olefins, preferably alpha-olefins, or polar comonomers, or any mixtures thereof. As said above such polar comonomers may additionally be present and are differentiated from the carbonyl containing compounds used for the functionalization. Functionalized LDPE copolymer of ethylene with polar comonomer may optionally comprise other comonomer(s), such as alpha-olefin(s). Polar comonomer is preferably selected from a comonomer containing hydroxyl group(s), alkoxy group(s), carbonyl group(s), carboxyl group(s), ether group(s) or ester group(s), or a mixture thereof, more preferably from a comonomer(s) containing carboxyl and/or ester group(s), still more preferably, the polar comonomer(s) is selected from the group of acrylate(s), methacrylate(s) acrylic acids, methacrylic acids or acetate(s), or any mixtures thereof. The polar comonomer(s) for the functionalized polar LDPE copolymer is more preferably selected from the group of alkyl acrylates, alkyl methacrylates, acrylic acids, methacrylic acids or vinyl acetate, or a mixture thereof. It is further preferred that the comonomers are selected from C1- to C6-alkyl acrylates, C1- to C6-alkyl methacrylates, acrylic acids, methacrylic acids and vinyl acetate, more preferred from C1- to C4-alkyl acrylate such as methyl, ethyl, propyl or butyl acrylate, or vinyl acetate, or any mixture thereof. The amount of the polar comonomer in the functionalized LDPE copolymer is preferably from 5 to 50 wt % based on the total amount of the composition, more preferred up to 30 wt %, most preferred up to 25 wt %. Functionalized LDPE homopolymer or LDPE copolymer is preferably selected from a MAH functionalized LDPE homopolymer, a MAH functionalized LDPE copolymer which is preferably selected from a MAH functionalized ethylene methyl acrylate (EMA), a MAH functionaliszed ethylene ethyl acrylate (EEA), a MAH functionalized ethylene butyl acrylate (EBA) or MAH functionalized ethyl vinyl acrylate (EVA), more preferably from MAH-g-LDPE homopolymer or MAH-g-LDPE copolymer, more preferably from MAH-g-EMA, MAH-g-EEA, MAH-g-EBA or MAH-g-EVA.

In case the functionalized polyolefin (C) is a functionalized polypropylene, then it is preferably selected from homopolymers of propylene, random copolymers of propylene or a heterophasic copolymer of propylene, which have the same meaning and properties as given above under the general description for the heterophasic copolymer of propylene (A) and which bear said carbonyl containing groups. Preferred polypropylene is homopolymer or a random copolymer of propylene.

According to a preferred embodiment of the polymer composition, the maleic anhydride functionalized, preferably grafted, polyolefin is maleic anhydride functionalized, preferably grafted, polypropylene (MAH-g-PP) or maleic anhydride functionalized, preferably grafted, polyethylene (MAH-g-PE).

Preferred polyolefin for the functionalized polyolefin (C) is a functionalized polypropylene as defined above. Such polypropylene (PP) for the functionalized polyolefin (C) is preferably a maleic anhydride functionalized PP, more preferably MAH-g-PP.

The functionalized polyolefin (C), more preferably the MAH functionalized PP, more preferably MAH-g-PP, has an $MFR_2$ (230° C., 2.16 kg) of from 0.5 to 500 g/10 min, preferably from 1.0 to 500 g/10 min.

Preferred Embodiments of the Semiconductive Composition

In one preferred embodiment the semiconductive composition of the present invention comprises, preferably consists of (A) from 57.5 to 84.5 wt %, preferably from 61.0 to 82.0 wt %, most preferably from 66.0 to 78.5 wt % of the heterophasic propylene copolymer (A), based on the total weight amount of the semiconductive composition;

(B) from 15.0 to 40.0 wt %, preferably from 17.5 to 38.0 wt %, most preferably from 21.0 to 33.0 wt % of carbon black, based on the total weight amount of the semiconductive composition, and (C) from 0.05 to 2.5 wt %, more preferably from 0.1 to 1.0 wt %, most preferably from 0.2 to 0.8 wt % of the functionalized polyolefin (C), wherein the heterophasic copolymer of propylene (A) has a melt flow rate $MFR_2$ of from 0.5 to 10.0 g/10 min, preferably from 0.7 to 7.5 g/10 min, most preferably from 1.0 to 5.0 g/10 min.

The heterophasic copolymer of propylene (A) thereby can have a melt flow rate $MFR_2$ of 0.5 to 2.5 g/10 min, preferably from 0.7 to 2.2 g/10 min, still more preferably from 1.0 to 2.0 g/10 min and most preferably from 1.2 to 1.9 g/10 min.

All other properties of the semiconductive composition, the components (A), (B) and (C) and optional further components as described herein also apply for said preferred embodiment.

In another preferred embodiment the semiconductive composition of the present invention comprises, preferably consists of (A) from 57.5 to 84.5 wt %, preferably from 61.0 to 82.0 wt %, most preferably from 66.0 to 78.5 wt % of the heterophasic propylene copolymer (A), based on the total weight amount of the semiconductive composition;

(B) from 15.0 to 40.0 wt %, preferably from 17.5 to 38.0 wt %, most preferably from 21.0 to 33.0 wt % of carbon black, based on the total weight amount of the semiconductive composition, and (C) from 0.05 to 2.5 wt %, more preferably from 0.1 to 1.0 wt %, most preferably from 0.2 to 0.8 wt % of the functionalized polyolefin (C), wherein the heterophasic copolymer of propylene (A) has a melt flow rate $MFR_2$ of 2.5 to 10.0 g/10 min, preferably from 3.0 to 7.5 g/10 min, most preferably from 3.5 to 5.0 g/10 min.

In said embodiment the heterophasic copolymer of propylene (A) is preferably vis-broken to obtain the required melt flow rate as described above.

Further, the heterophasic copolymer of propylene (A) preferably comprises a nucleating agent as described above.

All other properties of the semiconductive composition, the components (A), (B) and (C) and optional further components as described herein also apply for said preferred embodiment.

In yet another preferred embodiment the semiconductive composition of the present invention comprises, preferably consists of (A) from 65.0 to 85.0 wt %, preferably from 67.0 to 82.5 wt %, most preferably from 69.0 to 79.0 wt % of a heterophasic propylene copolymer having a matrix phase and an elastomeric phase dispersed in said matrix phase, based on the total weight amount of the semiconductive composition; and (B) from 15.0 to 35.0 wt %, preferably from 17.5 to 33.0 wt %, most preferably from 21.0 to 31.0 wt % of carbon black based on the total weight amount of the semiconductive composition, wherein the semiconductive composition is free of the functionalized polyolefin (C), and the heterophasic copolymer of propylene (A) has a melt flow rate $MFR_2$ of from 2.5 to 10.0 g/10 min, preferably from 3.0 to 7.5 g/10 min, most preferably from 3.5 to 5.0 g/10 min.

In said embodiment the heterophasic copolymer of propylene (A) is preferably vis-broken to obtain the required melt flow rate as described above.

Further, the heterophasic copolymer of propylene (A) preferably comprises a nucleating agent as described above.

All other properties of the semiconductive composition, the components (A) and (B) and optional further components as described herein also apply for said preferred embodiment.

Said last embodiment is especially preferred from the three embodiments as described above.

Article

In another aspect the present invention relates to an article comprising the semiconductive composition as described above or below.

Preferably said article is a cable comprising a semiconductive layer, more preferably an inner and/or outer semiconductive layer, comprising, preferably consisting of said semiconductive composition as described above or below.

The cable preferably comprises a conductor surrounded by at least a semiconductive layer comprising, preferably consisting of said semiconductive composition as described above or below.

The term "conductor" means herein above and below that the conductor comprises one or more wires. The wire can be for any use and be e.g. optical, telecommunication or electrical wire. Moreover, the cable may comprise one or more such conductors. Preferably the conductor is an electrical conductor and comprises one or more metal wires. The cable is preferably a power cable. A power cable is defined to be a cable transferring energy operating at any voltage, typically operating at voltages higher than 1 kV. The voltage applied to the power cable can be alternating (AC), direct (DC), or transient (impulse). The polymer composition of the invention is very suitable for power cables, especially for power cables operating at voltages 6 kV to 36 kV (medium voltage (MV) cables) and at voltages higher than 36 kV, known as high voltage (HV) cables and extra high voltage (EHV) cables, which EHV cables operate, as well known, at very high voltages. The terms have well known meanings and indicate the operating level of such cables.

In one embodiment the cable comprises a conductor surrounded by at least an inner semiconductive layer, an insulation layer and an outer semiconductive layer, in that order, wherein, at least the inner semiconductive layer or the inner and outer semiconductive layers comprise(s), preferably consist(s) of said semiconductive composition as described above or below.

Preferably, the cable is a MV or HV power cable, more preferably a MV power cable. Moreover the outer semiconductive layer can be strippable (peelable) or bonded (not peeled off), preferably bonded, which terms have a well known meaning.

As well known the cable can optionally comprise further layers, e.g. layers surrounding the insulation layer or, if present, the outer semiconductive layers, such as screen(s), a jacketing layer(s), other protective layer(s) or any combinations thereof.

The insulation layer of the cable, if present, preferably comprises, more preferably consists of a polyolefin composition, for example a polyethylene composition, such as a crosslinked polyethylene composition or a non-crosslinked polyethylene composition, or a polypropylene composition.

It is preferred that the insulation layer of the cable, if present, preferably comprises, more preferably consists of a thermoplastic polyolefin composition such as a non-cross-linked polyethylene composition or a non-crosslinked polypropylene composition.

It is especially preferred that the insulation layer of the cable, if present, preferably comprises, more preferably consists of a non-crosslinked polypropylene composition.

Said non-crosslinked polypropylene composition preferably comprises a heterophasic propylene copolymer as main polymeric component.

The cable comprising an semiconductive layer, preferably an inner semiconductive layer or an inner and outer semiconductive layer, comprising the semiconductive composition according to the invention as described above shows good electrical properties in form of good electrical properties represented by high Weibull alpha and high Weibull beta values when performing a Weibull analysis on a series of AC electrical breakdown results.

Further, the cable preferably has a Weibull alpha-value of at least 20.0 kV/mm, more preferably at least 25 kV/mm, still more preferably at least 30 kV/mm, even more preferably at least 35.0 kV/mm, yet more preferably at least 40.0 kV/mm and most preferably at least 44.0 kV/mm, when measured on a 10 kV cable.

The upper limit of the Weibull alpha-value is usually not more than 80.0 kV/mm, when measured on a 10 kV cable.

Still further, the cable preferably has a Weibull beta-value of at least 2.0, more preferably of at least 5.0, still more preferably of at least 6.5, even more preferably of at least 7.5, and most preferably of at least 10.0, when measured on a 10 kV cable. The upper limit of the Weibull beta-value is usually not more than 250.0, when measured on a 10 kV cable.

Thus, the semiconductive layer comprising the semiconductive composition according to the invention can be used for medium and high voltage cables.

In yet another aspect the present invention relates to the use of a semiconductive composition as described above or below as inner and/or outer semiconductive layer for medium and high voltage cables.

It is preferred that the semiconductive composition as described above or below is used as inner and/or outer semiconductive layer for improving the average breakdown strength of the medium and high voltage cables.

Benefits of the Invention

The semiconductive composition comprises a rather low amount of carbon black but nevertheless shows a good balance of conductive properties and mechanical properties.

Cables comprising an inner and optionally an outer semiconductive layer comprising the inventive semiconductive composition surprisingly show good electrical properties in form of average AC breakdown strength, Weibull alpha-value and Weibull beta-value.

When adapting the polymer composition of the insulation layer to a propylene based composition instead of an ethylene based composition the electrical properties can further be improved especially shown in a more even distribution of the electric breakdown strength and consequently a higher Weibull beta value. It is believed that this behavior results from an increased adhesion between the semiconductive and insulation layer due to the similar polymeric compositions.

EXAMPLES

1. Measurement Methods a) Melt Flow Rate ($MFR_2$)

The melt flow rate is the quantity of polymer in grams which the test apparatus standardized to ISO 1133 or ASTM D1238 extrudes within 10 minutes at a certain temperature under a certain load.

The melt flow rate $MFR_2$ of the heterophasic propylene copolymers is measured at 230° C. with a load of 2.16 kg according to ISO 1133.

The melt flow rate $MFR_{10}$ of the semiconductive compositions is measured at 230° C. with a load of 10 kg according to ISO 1133.

The melt flow rate $MFR_2$ of the ethylene based polymers and polyethylene compositions is measured at 190° C. with a load of 2.16 kg according to ISO 1133.

b) Density

The density is measured according to ISO 1183 on compression moulded plaques.

c) Comonomer Content

Quantitative nuclear-magnetic resonance (NMR) spectroscopy was used to quantify the comonomer content of the polymers.

Comonomer Content Quantification of Poly(Propylene-Co-Ethylene) Copolymers

Quantitative $^{13}C$ $\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probe head at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent {8}. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {3, 4}. A total of 6144 (6 k) transients were acquired per spectra.

Quantitative $^{13}C$ $\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}C$ $\{^1H\}$ spectra. This method was chosen for its robust nature and ability to account for the presence of regiodefects when needed. Integral regions were slightly adjusted to increase applicability across the whole range of encountered comonomer contents. For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

BIBLIOGRAPHIC REFERENCES

1) Busico, V., Cipullo, R., Prog. Polym. Sci. 26 (2001) 443.
2) Busico, V., Cipullo, R., Monaco, G., Vacatello, M., Segre, A. L., Macromolecules 30 (1997) 6251.
3) Zhou, Z., Kuemmerle, R., Qiu, X., Redwine, D., Cong, R., Taha, A., Baugh, D. Winniford, B., J. Mag. Reson. 187 (2007) 225.
4) Busico, V., Carbonniere, P., Cipullo, R., Pellecchia, R., Severn, J., Talarico, G., Macromol. Rapid Commun. 2007, 28, 1128.
5) Resconi, L., Cavallo, L., Fait, A., Piemontesi, F., Chem. Rev. 2000, 100, 1253.
6) Wang, W-J., Zhu, S., Macromolecules 33 (2000), 1157.
7) Cheng, H. N., Macromolecules 17 (1984), 1950.
8) Singh, G., Kothari, A., Gupta, V., Polymer Testing 28 5 (2009), 475.
9) Kakugo, M., Naito, Y., Mizunuma, K., Miyatake, T. Macromolecules 15 (1982) 1150.
10) Randall, J. Macromol. Sci., Rev. Macromol. Chem. Phys. 1989, C29, 201.
11) Resconi, L., Cavallo, L., Fait, A., Piemontesi, F., Chem. Rev. 2000, 100, 1253.

d) Differential Scanning Calorimetry (DSC) Analysis, Melting Temperature (Tm) and Crystallization Temperature (Tc).

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C.

Crystallization temperature and heat of crystallization (Hc) are determined from the cooling step, while melting temperature and heat of fusion (Hf) are determined from the second heating step.

e) Xylene Cold Solubles (XCS) Content

The quantity of xylene soluble matter in polypropylene is determined according to the ISO16152 (first edition; 2005-07-01).

A weighed amount of a sample is dissolved in hot xylene under reflux conditions at 135° C. The solution is then cooled down under controlled conditions and maintained at 25° C. for 30 minutes to ensure controlled crystallization of the insoluble fraction. This insoluble fraction is then separated by filtration. Xylene is evaporated from the filtrate leaving the soluble fraction as a residue. The percentage of this fraction is determined gravimetrically.

$$\%\ XS=\frac{m_1\times v_0}{m_0\times v_1}\times 100$$

where $m_0$ is the mass of the sample test portion weighed, in grams $m_1$ is the mass of residue, in grams $v_0$ is the original volume of solvent taken $v_1$ is the volume of the aliquot taken for determination.

f) Intrinsic Viscosity ($IV_{int}$)

The reduced viscosity (also known as viscosity number), $\eta_{red}$, and intrinsic viscosity, [η], are determined according to ISO 1628-3: "Determination of the viscosity of polymers in dilute solution using capillary viscometers".

Relative viscosities of a diluted polymer solution with concentration of 1 mg/ml and of the pure solvent (decahydronaphthalene stabilized with 200 ppm 2,6-bis(1,1-dimethylethyl)-4-methylphenol) are determined in an automated capillary viscometer (Lauda PVS1) equipped with 4 Ubbelohde capillaries placed in a thermostatic bath filled with silicone oil. The bath temperature is maintained at 135° C. The sample is dissolved with constant stirring until complete dissolution is achieved (typically within 90 min).

The efflux time of the polymer solution as well as of the pure solvent are measured several times until three consecutive readings do not differ for more than 0.2 s (standard deviation).

The relative viscosity of the polymer solution is determined as the ratio of averaged efflux times in seconds obtained for both, polymer solution and solvent:

$$\eta_{rel}=\frac{t_{solution}-t_{solvent}}{t_{solvent}}\ [\text{dimensionless}]$$

Reduced viscosity ($\eta_{red}$) is calculated using the equation:

$$\eta_{red}=\frac{t_{solution}-t_{solvent}}{t_{solvent}*C}\ [\text{dl/g}]$$

where C is the polymer solution concentration at 135° C.:

$$C=\frac{m}{V\gamma},$$

and m is the polymer mass, V is the solvent volume, and γ is the ratio of solvent densities at 20° C. and 135° C. ($\gamma=\rho_{20}/\rho_{135}=1.107$).

The calculation of intrinsic viscosity [η] is performed by using the Schulz-Blaschke equation from the single concentration measurement:

$$[\eta]=\frac{\eta_{red}}{1+K+C+\eta_{red}}$$

where K is a coefficient depending on the polymer structure and concentration. For calculation of the approximate value for [η], K=0.27.

g) Flexural Modulus

The flexural modulus was determined according to ISO 178 method A (3-point bending test) on 80 mm×10 mm×4 mm specimens. Following the standard, a test speed of 2 mm/min and a span length of 16 times the thickness was used. The testing temperature was 23±2° C. Injection moulding was carried out according to ISO 19069-2.

h) Tensile Measurements

A tape was extruded with a thickness of 1.00-1.20 mm, a width of 100 mm and a length of 1.00 m. After 1 hour, resp. 16 h of conditioning at 23° C.±2° C., 5 specimens (S2 geometry) were punched out of this tape. The mechanical properties were measured by using an extensometer and an initial length Lo of 20 mm. The test speed was 25 mm/min. The tensile strength and elongation at break are given as average values from the individual measurements.

i) Charpy Notched Impact Strength Test—Edgewise

The Charpy notched impact strength was determined according to ISO 179-1/1 eA on notched 80 mm×10 mm×4 mm specimens (specimens were prepared according to ISO 179-1/1 eA). Testing temperatures were 23±2° C. or −20±2° C. Injection moulding was carried out according to ISO 19069-2.

j) Volume Resistivity (VR)

A tape was extruded with a thickness of 1.00-1.20 mm, a width of 100 mm and a length of 1.00 m. From this tape 5 specimens were punched out (1 mm×100 mm×15 mm). Conductive silver is applied to both ends of the test specimens with a brush, each about 10 mm wide. After drying the resistivity were measured by attaching the clamps of a digital Multimeter's at the silver conducted parts of the specimens. The volume resistivity is calculated by using following equation:

$$e=RD*(a*b)/L$$

with RD=resistivity [Ω]

a=Thickness of specimen [cm]

b=width of specimen [cm]

L=effective length (length without conductive silver coating)

The resistance is given as the average value from the individual measurements.

k) AC Electric Breakdown Strength (ACBD)

The AC breakdown tests were performed in agreement with CENELEC HD 605 5.4.15.3.4 for 6/10 kV cables. The cable was thus cut into six test samples of 10 meter active length (terminations in addition). The samples were tested to breakdown with a 50 Hz AC step test at ambient temperature, according to the following procedure:

Start at 18 kV for 5 minutes

Voltage increasing in step of 6 kV every 5 minutes until breakdown occurs

The calculation of the Weibull parameters of the data set of six breakdown values (conductor stress, i.e. the electric field at the inner semiconductive layer) follows the least squares regression procedure as described in IEC 62539 (2007). The Weibull alpha parameter in this document refers to the scale parameter of the Weibull distribution, i.e. the voltage for which the failure probability is 0.632. The Weibull beta value refers to the shape parameter.

2. Production of the Semiconductive Compositions

The following resins were used for the preparation of the propylene copolymer compositions of the examples:

a) Polymerization of the Heterophasic Propylene Copolymers HECO1 and HECO2

Catalyst

The catalyst used in the polymerization process for the heterophasic propylene copolymers HECO1 and HECO2 is a Ziegler-Natta catalyst, which is described in patent publications EP491566, EP591224 and EP586390. As co-catalyst triethyl-aluminium (TEAL) and as donor dicyclo pentyl dimethoxy silane (D-donor) was used.

Polymerization of the Heterophasic Propylene Copolymers HECO1 and HECO2

Heterophasic propylene copolymers HECO1 and HECO2 have been produced in a Borstar™ plant in the presence of the above described polymerization catalyst using one liquid-phase loop reactor and two gas phase reactors connected in series under conditions as shown in Table 1. The first reaction zone was a loop reactor and the second and third reaction zones were gas phase reactors. The matrix phase was polymerized in the loop and first gas phase reactor and the elastomeric phase was polymerized in the second gas phase reactor.

TABLE 1

Polymerization and extrusion conditions of heterophasic propylene copolymers HECO1 and HECO2:

| | | HECO1 | HECO2 |
|---|---|---|---|
| Prepolymerization | | | |
| Catalyst feed | [kg/h] | 0.24 | 0.28 |
| TEAL/Ti ratio | [mol/mol] | 342 | 307 |
| Donor/Ti ratio | [mol/mol] | 26.9 | 24.6 |
| Temperature | [° C.] | 19.9 | 20.0 |
| Pressure | [barg] | 55.0 | 55.0 |
| Residence time | [h] | 0.16 | 0.19 |
| Loop | | | |
| Temperature | [° C.] | 70.0 | 70.0 |
| Pressure | [barg] | 55 | 55 |
| Split (Loop + Prepol) | | 16.2 | 19.1 |
| H2/C3 ratio | [mol/kmol] | 5.50 | 5.50 |
| C3-feed | [to/h] | 19.2 | 20.3 |
| C2-feed | [kg/h] | 213.9 | 229.3 |
| Residence time | [h] | 0.86 | 0.79 |
| MFR (230° C./2.16 kg) | [g/10 min] | 6.4 | 6.3 |
| C2 content (FTIR) | [wt %] | 2.0 | 2.1 |
| GPR1 | | | |
| Temperature | [° C.] | 74.9 | 75.0 |
| Pressure | [barg] | 21.0 | 21.0 |
| Split | [%] | 60.0 | 59.0 |
| C3-feed | [to/h] | 8.0 | 8.2 |
| H2/C3 ratio | [mol/kmol] | 21.3 | 17.7 |
| C2/C3 ratio | [mol/kmol] | 53.4 | 53.2 |
| Residence time | [h] | 2.87 | 2.68 |
| MFR (230° C./2.16 kg) | [g/10 min] | 1.9 | 1.4 |
| C2 content (FTIR) | [wt %] | 6.6 | 6.8 |
| GPR2 | | | |
| Temperature | [° C.] | 79.99 | 79.99 |
| Pressure | [barg] | 16.03 | 15.12 |
| Split | [%] | 23.2 | 21.9 |
| C2-feed | [kg/h] | 3371.28 | 3319.11 |
| C2/C3 ratio | [mol/kmol] | 401 | 368 |
| H2/C3 ratio | [mol/kmol] | 68.97 | 63.23 |
| Residence time | [h] | 1.3 | 1.2 |
| MFR (230° C./2.16 kg) | g/10 min | 1.2 | 1.8 |
| C2 content FTIR | [wt %] | 12.6 | 13.0 |
| XCS | [wt %] | 34.4 | 35.3 |
| Pellet properties after extrusion | | | |
| Visbreaking step | | no | yes |
| MFR (230° C./2.16 kg | g/10 min | 1.2 | 3.9 |
| C2 content (total, NMR) | [wt %] | 12.4 | 11.3 |
| XCS | [wt %] | 35.7 | 34.7 |

In the extrusion step HECO2 was vis-broken to a melt flow rate $MFR_2$ (230° C., 2.16 kg) of 3.9 g/10 min as disclosed in the example section of WO 2017/198633 and alpha-nucleated by adding 2 wt % of a propylene homopolymer with an $MFR_2$ (230° C., 2.16 kg, ISO 1133) of 8.0 g/10 min and a melting temperature of 162° C., which was produced with a Ziegler-Natta type catalyst in the *Borealis* nucleation technology (BNT), comprising a polymeric alpha-nucleating agent and distributed by *Borealis* AG (Austria).

Preparation of the Semiconductive Compositions

In a first approach for determining volume resistivities of the semiconductive compositions over a broad range of amount of carbon black the heterophasic propylene copolymer HECO1 was compounded with a functionalized polypropylene and carbon black in different amounts using a X-Compound continuous kneader CK 45 to semiconductive compositions IE1, IE2, IE3, IE4 and IE5. The amounts of the different components in the semiconductive compositions are listed below in Table 2.

Carbon black (CB) was Printex Alpha, commercially available from Orion Engineered Carbons GmbH.

The functionalized polyolefin (MAH-g-PP) was maleic anhydride grafted propylene homopolymer Exxelor PO1020 having a melt flow rate $MFR_2$ (230° C., 2.16 kg) of 430 g/10 min, commercially available from ExxonMobil.

Reference semiconductive composition Ref is ready-to-use semiconductive composition Borlink LE7710, which is a non-crosslinkable polyethylene based composition comprising carbon black and 8000 ppm 2,2,4-trimethyl-1,2-dihydroquinoline (TMQ), commercially available from *Borealis* AG.

TABLE 2

Properties of semiconductive compositions of IE1-IE5 and RE1 [wt %]

| Example | HECO | CB [wt %] | MAH-g-PP [wt %] | VR [Ωcm] |
|---|---|---|---|---|
| IE1 | HECO1 | 20 | 0.5 | 218.4 |
| IE2 | HECO1 | 25 | 0.5 | 26.7 |
| IE3 | HECO1 | 30 | 0.5 | 7.4 |
| IE4 | HECO1 | 33 | 0.5 | 3.8 |
| IE5 | HECO1 | 35 | 0.5 | 2.8 |
| Ref | LE7710 | 39 | 0 | 3.9 |

It was verified that all examples IE1 to IE5 are easily extrudable and show volume resistivities well below the threshold value for medium voltage cables of 1000 Qcm.

Preparation of Semciconductive Compositions for Pilot Cables

In a second—larger scale—approach semiconductive compositions using HECO1 and HECO2 were produced for later use as semiconductive layer in pilot cables.

For IE6 the heterophasic propylene copolymer HECO1 was compounded with the functionalized polypropylene and carbon black.

For IE7 the heterophasic propylene copolymer HECO2 was compounded with the functionalized polypropylene and carbon black.

For IE8 the heterophasic propylene copolymer HECO2 was compounded only with carbon black.

Carbon black (CB) was Printex Alpha.

The functionalized polyolefin (MAH-g-PP) was Exxelor PO1020.

The amounts and components of the compositions, the properties of the resultant semiconductive compositions and the extrusion conditions for the production of the semiconductive compositions are listed below in Table 3:

TABLE 3

Components, properties and extrusion conditions of IE6-IE8

| Example code in patent | | IE6 | IE7 | IE8 |
|---|---|---|---|---|
| Components | | | | |
| Base resin | wt % | HECO1 66.5 | HECO2 66.5 | HECO2 70.0 |
| CB | wt % | 33.0 | 33.0 | 30.0 |
| MAH-g-PP | wt % | 0.5 | 0.5 | 0.0 |
| Properties semiconductive composition | | | | |
| MFR10 230° C./10 kg | g/10 min | 1.8 | 6.4 | 9.4 |
| VR | Ωcm | 3.0 | 2.7 | 4.1 |
| Density | g/cm$^3$ | 1.055 | 1.060 | 1.039 |
| Tensile strength after 16 h | MPa | 13.3 | 13.5 | 13.0 |
| elongation at break after 16 h | % | 417 | 359 | 526 |
| Compounding conditions | | | | |
| extruder temperatures | ° C. | 80-216 | 80-214 | 80-200 |
| Extruder rpm | 1/min | 44 | 50 | 52 |

Production of 10 kV Pilot Cables 10 kV test cables were produced on a Maillefer pilot cable line of catenary continuous vulcanizing (CCV) type.

The conductors of the cable cores had a cross section being 50 mm$^2$ of stranded aluminium and had a cross section of 50 mm$^2$. The inner semiconductive layer was produced from either semiconductive compositions IE7 and IE8 or LE7710 (Ref) and had a thickness of 1.0 mm. The insulation layer was produced from a polypropylene composition comprising a heterophasic propylene copolymer and had a thickness of 3.4 mm nominal insulation thickness. For the outer semiconductive layer the same compositions as for the inner semiconductive layer was used. It had a thickness of 1.0 mm.

The cables, i.e. cable cores, were produced by extrusion via a triple head. The insulation extruder had size 100 mm, the extruder for conductor screen (inner semiconductive layer) 45 mm, and the extruder for insulation screen (outer semiconductive layer) 60 mm. The line speed was 6.0 m/min.

The vulcanisation tube had a total length of 52.5 meter consisting of a curing section followed by a cooling section. The curing section was filled with $N_2$ at 10 bar but not heated. The 33-meter long cooling section was filled with 20-25° C. water.

The pilot cables were then subjected to AC breakdown testing. 10 kV cables comprising an inner semiconductive layer made of IE7 or IE8, respectively, and an insulation layer comprising a heterophasic propylene copolymer as main polymeric component show a comparable Weibull alpha value and a higher Weibull beta value compared to 10 kV cables comprising an inner semiconductive layer prepared from LE7710 (Ref) and the same insulation layer. The higher Weibull beta value indicates a more even distribution of the ACBD. The ACBD for all cables was in the range of 25 to 52 kV/mm for all cable pieces.

The invention claimed is:

1. A semiconductive composition comprising:

(A) at least 52.0 wt % of a heterophasic propylene copolymer having a matrix phase and an elastomeric phase dispersed in said matrix phase, based on the total weight amount of the semiconductive composition; and (B) from 5.0 to 40.0 wt % of carbon black based on the total weight amount of the semiconductive composition, wherein the semiconductive composition has a melt flow rate $MFR_{10}$ (230° C., 10 kg load) of from 0.5 to 15.0 g/10 min.

2. The semiconductive composition according to claim 1, wherein the semiconductive composition further comprises (C) a polyolefin functionalized with a mono- or polycarboxylic acid compound or a derivative of a mono- or polycarboxylic acid compound, wherein the functionalized polyolefin (C) is different from the heterophasic propylene copolymer (A) and is present in an amount of not more than 5.0 wt % based on the total weight amount of the semiconductive composition.

3. The semiconductive composition according to claim 1 being free of 2,2,4-trimethyl-1,2-dihydroquinoline (TMQ).

4. The semiconductive composition according to claim 1, wherein the heterophasic copolymer of propylene (A) comprises comonomer units selected from ethylene or alpha-olefins having from 4 to 12 carbon atoms, preferably ethylene, in a total amount of from 7.5 to 20.0 wt %, based on the total amount of monomer units of the heterophasic copolymer of propylene (A).

5. The semiconductive composition according to claim 1, wherein the heterophasic copolymer of propylene (A) has a xylene cold soluble (XCS) fraction in a total amount of from 25.0 to 50.0 wt %, based on the total weight amount of the heterophasic copolymer of propylene (A).

6. The semiconductive composition according to claim 5, wherein the xylene cold soluble (XCS) fraction of the heterophasic copolymer of propylene (A) has an amount of comonomer units of from 20.0 to 35.0 wt %, based on the total amount of monomer units in the xylene cold soluble (XCS) fraction of the heterophasic copolymer of propylene (A).

7. The semiconductive composition according to claim 1, wherein the heterophasic copolymer of propylene (A) has a melt flow rate $MFR_2$ of from 0.5 to 10.0 g/10 min.

8. The semiconductive composition according to claim 1, wherein the heterophasic copolymer of propylene (A) has a melting temperature Tm of from 140 to 159° C., and/or a crystallization temperature Tc of from 85 to 125° C.

9. The semiconductive composition according to claim 1 having a volume resistivity (VR) of from 1.0 to 20.0 Ohm·cm.

10. The semiconductive composition according to claim 2 comprising:

(A) from 57.5 to 84.5 wt % of the heterophasic propylene copolymer (A), based on the total weight amount of the semiconductive composition;

(B) from 15.0 to 40.0 wt % of carbon black, based on the total weight amount of the semiconductive composition, and (C) from 0.05 to 2.5 wt % of the functionalized polyolefin (C), wherein the heterophasic copolymer of propylene (A) has a melt flow rate $MFR_2$ of from 0.5 to 10.0 g/10 min.

11. The semiconductive composition according to claim 10, wherein the heterophasic copolymer of propylene (A) has a melt flow rate $MFR_2$ of from 2.5 to 10.0 g/10 min.

12. The semiconductive composition according to claim 1 comprising (A) from 65.0 to 85.0 wt % of a heterophasic propylene copolymer having a matrix phase and an elastomeric phase dispersed in said matrix phase, based on the total weight amount of the semiconductive composition; and (B) from 15.0 to 35.0 wt % of carbon black based on the total weight amount of the semiconductive composition, wherein the semiconductive composition is free of a functionalized polyolefin (C), and the heterophasic copolymer of propylene (A) has a melt flow rate $MFR_2$ of from 2.5 to 10.0 g/10 min.

13. An article comprising the semiconductive composition according to claim 1.

14. The article according to claim 13, wherein the semiconductive composition is the inner and/or outer semiconductive layer of a medium and high voltage cable.

15. The article according to claim 13, being a cable comprising a semiconductive layer comprising the semiconductive composition.

* * * * *